Dec. 26, 1967
G. E. ELLIOTT
3,359,854
APPARATUS FOR THE PRODUCTION OF MICROSCOPIC
LINEAR MEASURING SCALE
Filed May 14, 1963
2 Sheets-Sheet 1
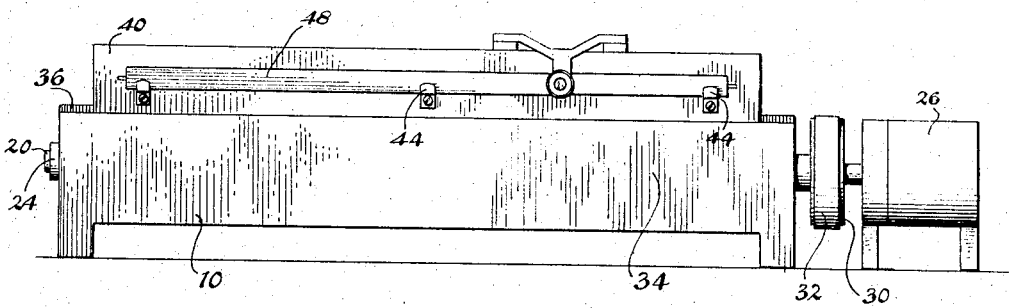
INVENTOR.
GORDON E. ELLIOTT
BY
Beau, Brooks, Buckley & Beau
ATTORNEYS Dec. 26, 1967     G. E. ELLIOTT     3,359,854
APPARATUS FOR THE PRODUCTION OF MICROSCOPIC LINEAR MEASURING SCALE
Filed May 14, 1963

INVENTOR.
GORDON E. ELLIOTT
BY
Bean, Brooks, Buckley & Bean
ATTORNEYS

United States Patent Office 3,359,854
Patented Dec. 26, 1967

3,359,854
APPARATUS FOR THE PRODUCTION OF MICROSCOPIC LINEAR MEASURING SCALE
Gordon E. Elliott, Bronx, N.Y.
(61 Spruce St., Jamestown, N.Y. 14701)
Filed May 14, 1963, Ser. No. 299,131
4 Claims. (Cl. 88—24)

This invention relates to an apparatus for the production of precision photographic copies of master negatives or diapositives, and is particularly directed to the manufacture of precise scales, rulings and the like by projection printing.

For many practical applications, it is desirable to provide a measuring scale having a high degree of accuracy over a relatively great length. For example, it would be highly desirable to provide reproducible measuring scales of 6–24 inch lengths, or longer, in which the scales are capable of being read to $1/10,000$ of an inch and with no more than a few millionths of an inch error in the scales over any given twelve inch span. As a minimum, such a scale would require one thousand lines per inch in which, for ease of reading either directly or in conjunction with a vernier scale, the individual lines would be of a width or thickness in the order of $1/10,000$ of an inch. To render such reproduction economically feasible, while achieving the requisite accuracy, the use of a photographic process is indicated since such a process inherently possesses high integrity, reliability and simplicity.

Photographic printing of scales may be achieved either by contact printing or by projection printing techniques. In the former method the original is held in close contact with the film or plate on which the copy is to be made. A small, distant source of light or a collimated beam of light passing through the original is used to make the exposure on the plate. Although this method permits fairly long scales to be printed, inaccuracies caused by diffraction effects and by shadowing of microscopic inhomogenieties are difficult to overcome. With the projection printing method, on the other hand, it is difficult to produce closely ruled, highly accurate scales of great length. Ordinary optical projection printing in which the full length of scale would be exposed simultaneously is not feasible for the reason that optical systems capable of combining the nescessary high resolution with a complete absence of distortion over a field size encompassing the length of the scale (24 inches or greater) are extremely difficult to compute and to construct. To overcome this difficulty, an alternative arrangement for optical projection printing is one in which various portions of the material being reproduced are exposed in sequence, or serially. A variety of such techniques are known and used in document copying and in motion picture film printing, and although these techniques are entirely adequate for their intended purpose, they do not possess the accuracy or stability necessary for the purpose of this invention.

Accordingly, it is an object of this invention to provide an improved projection printing assembly for producing long scales of high dimensional accuracy.

It is a further object of this invention to provide a means for scale reproduction having inherent integrity of reproduction.

Another object of the invention is to provide a means for precise scale printing which is rapid and convenient.

Still another object is to provide a means for producing precise photographic scales in quantity and at low cost.

Other objects and advantages of the invention will appear from the description hereinbelow and the accompanying drawing wherein:

FIG. 1 shows in simplified form the side elevational view of a printer made in accordance with the invention;

FIG. 2 is an end elevational view of the printer of FIG. 1;

Figure 3:
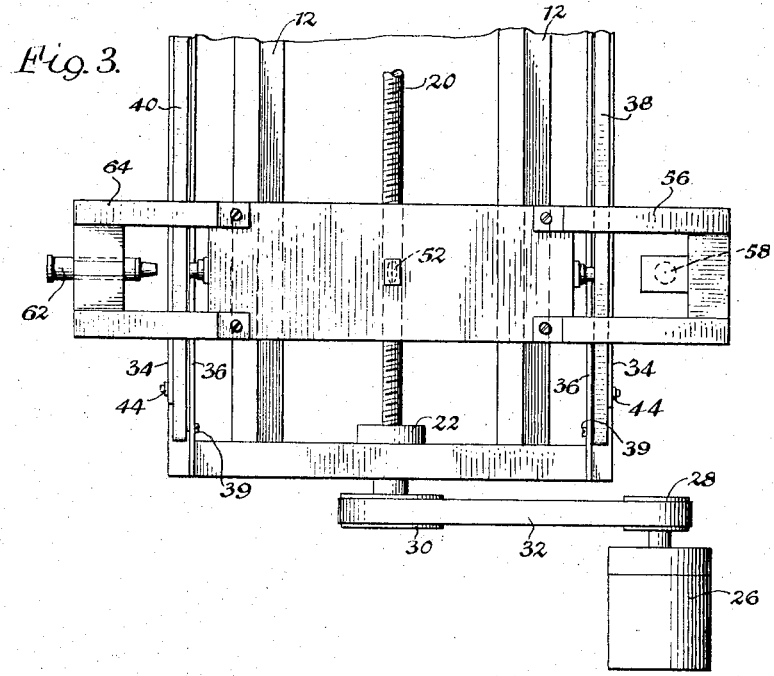
FIG. 3 is a plan view of the printer of FIG. 1.

In FIGS. 1 to 3 the printer is shown as having a frame portion 10 provided with a pair of ways 12 which may be of any suitable form having either kinematic or semikinematic supporting relationship to a pair of slide members 14 at the underside of a platform or carriage 16. A threaded nut 18 carried by and depending from the carriage 16 engages a drive screw 20 which is supported by bearings 22 and 24 at the ends of the frame portion and which is driven in turn by motor 26 through pulleys 28 and 30 and belt 32. Motor 26 is preferably of a type having its speed accurately governed by a control means, not shown, in order to insure uniform exposure.

Frame 10 includes a pair of upright, parallel, side portions 34, the top surfaces of which are made accurately flat and are provided with a raised rim or lip 36. A negative carrier 38 is supported atop one of side portions 34 and a plate or film carrier 40 is supported atop the other side portion. Each of the carriers 38 and 40 is provided with a longitudinal slit 42 which extends to within a short distance of its ends. Attached to carrier 38 by suitable means such as clamps 44 is a negative 46 of the scale to be printed. The plate 48 on which the scale is to be printed is similarly supported on carrier 40. Plate 48 is preferably of the extremely fine grain type such as spectroscopic plate 649 GH made by the Eastman Kodak Company.

Carriage 16 supports at each side suitable lenses 50 and 50a which are preferable well corrected microscope objectives or microprojection lenses having substantially identical focal lengths. Between the lenses 50 is a field lens 52. A light source 54, attached to one side of the carriage by means of arm 56, contains a suitable lamp 58 and condenser lenses 60, the latter being on the same optical axis as lenses 50 and 52 and the centers of negative 46 and plate 48. A microscope 62, carried by arm 64 attached to the other side of the carriage also shares this optical axis, and is focused on the light sensitive surface of plate 48.

Figure 4:
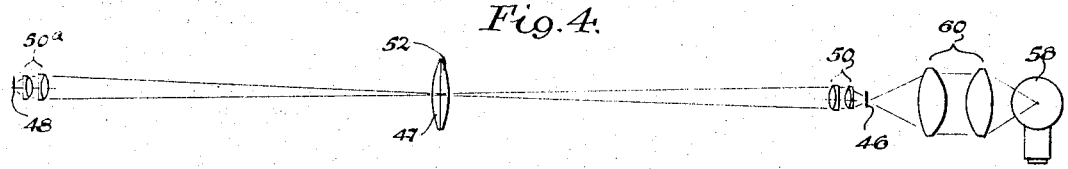
FIG. 4 shows diagrammatically the optical system of the printer.
Figure 5:
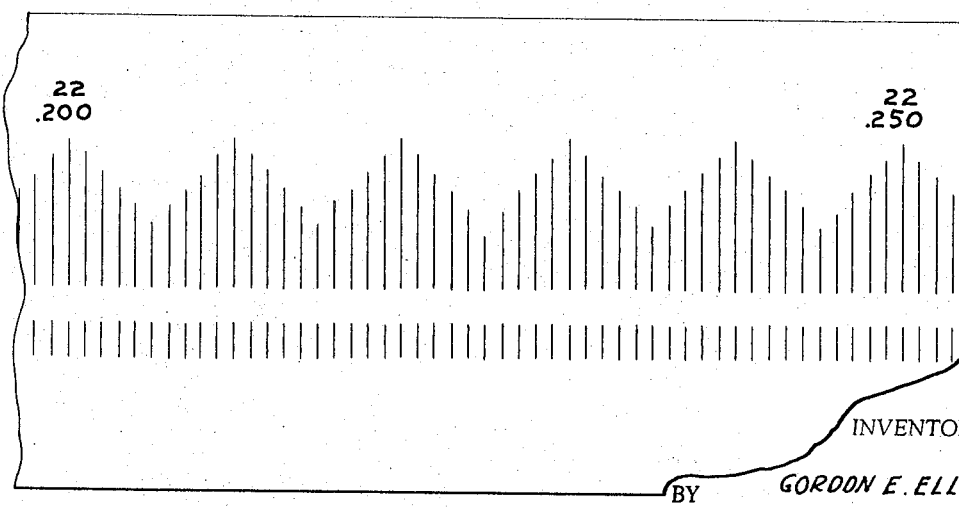
FIG. 5 is an example of the type of scale produced by the invention.

In operation, the lamp 58 is energized and light passes through condensers 60 and negative 46 to objective 50 which forms an inverted image 47 of a portion 46 of the scale in negative 46 on field lens 52 as shown in FIG. 4. Inverted image 47 is reimaged by objective 50 to form a final image 48 on the photographic plate. Inasmuch as objectives 50 and 50a have the same focal length and, further, because the optical system is symmetrical about the inverted image 47 in field lens 52, the final image 48 is identical in dimension as well as in attitude with the original 46. With the aid of microscope 62 the correct focusing of the objectives is established as well as adjustment for a parallelism between holders 38 and 40. This adjustment which is made by means of screws 39 threaded through rims 36, ordinarily need not be changed once the proper alignment has been made.

When motor 26 is energized, carriage 16 traverses the length of the ways. During its travel lens 50 forms a moving image of each successive portion of stationary scale 46 which is in turn reimaged on each successive portion of the stationary plate 48. When the traverse has been completed plate 48 is removed and developed in accordance with well known procedures. The result is a scale whose dimensions are identical with those in the original negative 46. The geometry of the printer is such that no dimensional error can be introduced by the optical system, and no error can arise as a result of relative movement of object and image because of the fixed relationship between the original and the copy. Although departure from exact optical symmetry or lack of precise focusing of the lenses will result in thickening of the scale lines, the linear accuracy of the scale will be unaffected, i.e., the centers of these thicker scale lines will still retain the same spacing as in the original. Because the focal length of objectives 50 and 50a is short, i.e., 20 to 40 mm., and the relative aperture is high, the resultant depth of focus is extremely shallow and it is necessary that objectives 50 and 50a be positioned from master 46 and plate 48, respectively, with considerable accuracy.

From the above, it will be apparent that by using an optical system having three conjugate planes; one at the negative, one at the film and one intermediate conjugate plane, and by imposing symmetry upon this optical system, an erect, real image will be formed on the film which is an exact copy of the original (that is, a 1:1 system), permitting the film and negative to be interdependently mounted in fixed and immovable relation to each other. Thus, no errors can arise as a result of relative movement between film and negative. It remains, then, merely to provide uniform linear movement between the optical system and the means which mounts the film and negative in fixed, parallel relation. In this way, only two main parts or assemblies must be controlled so that the system may be inherently stable and accurate. Additionally, the particular type of optical system employed to achieve the above relationships also allows the inherent advantage of high resolution to be utilized. That is, as stated hereinbefore, the two objectives may be well corrected and of relatively high numerical aperture, thereby enhancing the accuracy of the system.

It is obvious that this invention may be employed for producing, in addition to linear scales, exact rulings, reticles and continuous or discontinuous designs and patterns of all types from a photographic original or engraved master. It is also obvious that negatives may be made from positives, or vice versa, and that the maximum dimensions are limited in length only by the length of the printer bed and in width only by the ability of the objectives to sharply cover a field equal only to the width of the scale. Although the description relates to the use of a transparent master or original it should be understood that opaque originals, in conjunction with a suitable light source for illuminating the opaque surface, could be employed equally well in the practice of the invention.

What is claimed is:

1. In a photographic projection printer including means for holding a photographic original immovably in a given plane and means for holding a print receiving surface immovably in a second plane parallel to and spaced from said first plane, an optical projection system for imaging a portion of said photographic original on a corresponding portion of the surface of said print receiving surface, said optical projection system being symmetrical about its center, and means for transporting said optical system parallel to said first and second planes.

2. In a photographic projection printer as claimed in claim 1, said optical projection system comprising a first objective for producing an inverted magnified intermediate image of the original and a second objective for producing a reduced erect final image from said intermediate image, said final image being of the same size as the original.

3. A photographic projection printer comprising, in combination, an original having an elongate scale thereon, an elongate print-receiving member having a sensitive surface, support means for holding said original and said print receiving member in spaced, parallel fixed relation to each other, an optical projection system having three conjugate planes, one at said scale, one at said sensitive surface, and one midway between the first two, and means for imparting substantially uniform relative motion between said support means and said optical system in a direction along the length of said scale.

4. A photographic projection printer comprising, in combination, an original having an elongate scale thereon, an elongate print-receiving member having a sensitive surface, common support means mounting both said original and said print-receiving member with said original and said print-receiving member in spaced, parallel and fixed relation to each other, a symmetrical optical projection system for imaging a portion of said original on a corresponding portion of the sensitive surface of said print-receiving member, and means for imparting substantially uniform relative motion between said support means and said optical system in a direction along the length of said scale.

References Cited

UNITED STATES PATENTS

| | | | |
|---|---|---|---|
| 1,855,370 | 4/1932 | Trenor | 88—24 |
| 2,143,059 | 1/1939 | Dimmick | 88—24 |
| 2,313,119 | 3/1943 | Brand | 95—4.5 |
| 2,464,793 | 3/1949 | Cooke | 88—24 |

NORTON ANSHER, *Primary Examiner.*

N. G. TORCHIN, *Examiner.*

A. E. TANENHOLTZ, RICHARD A. WINTERCORN,
                                *Assistant Examiners.*